(12) United States Patent
Tepe

(10) Patent No.: US 8,776,489 B2
(45) Date of Patent: Jul. 15, 2014

(54) MOWING CUTTER DISC HAVING A MOWING BLADE AND A HOLDER

(75) Inventor: Heinrich Tepe, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/425,890

(22) Filed: Mar. 21, 2012

(65) Prior Publication Data

US 2013/0247530 A1 Sep. 26, 2013

(51) Int. Cl.
*A01D 34/52* (2006.01)

(52) U.S. Cl.
USPC .......................................... 56/295

(58) Field of Classification Search
USPC ............ 56/295, 17.5, 255, DIG. 20, DIG. 17, 56/289, 1
See application file for complete search history.

(56) References Cited

U.S. PATENT DOCUMENTS

| | | | | |
|---|---|---|---|---|
| 3,465,507 | A | * | 9/1969 | Fishaw ............................ 56/294 |
| 4,694,942 | A | * | 9/1987 | Ogano et al. ................ 192/13 A |
| 4,761,940 | A | * | 8/1988 | Wolff .............................. 56/13.6 |
| 2003/0196332 | A1 | | 10/2003 | Harris et al. |

FOREIGN PATENT DOCUMENTS

DE 19521067 12/1996
EP 1008289 6/2000

OTHER PUBLICATIONS

European Search Report, Apr. 18, 2012, 5 pages.

* cited by examiner

*Primary Examiner* — Thomas B Will
*Assistant Examiner* — Mai Nguyen

(57) ABSTRACT

A quick-change mowing blade arrangement is provided. The mowing blade has a shaped feature and a hole which maintain a certain spacing X from one another. For installation, the mowing blade is held, by means of the hole, pivotally on a head of a peg. If the head) undergoes an impermissible amount of wear, the shaped feature is no longer hidden by a cover of the mowing cutter disc, but becomes visible.

2 Claims, 3 Drawing Sheets

MOWING CUTTER DISC HAVING A MOWING BLADE AND A HOLDER

FIELD OF THE INVENTION

The invention relates to a mowing cutter disc having a mowing blade and a holder. The holder being supported by the mowing cutter disc and being suitable for passing through a hole in the mowing blade. In the installed condition an inner region of the mowing blade is hidden while an outer region is exposed. The holder may not exceed a maximum permissible amount of wear. The invention further relates to a mowing blade.

BACKGROUND OF THE INVENTION

German patent document DE 195 21 067 A1 discloses the possibility of securing mowing blades to a mowing cutter disc by way of a quick-change mechanism. In a quick-change mechanism of this kind, a holder in the form of a bolt or peg is pivoted into a change-over position such that it comes out of engagement with the mowing blade so that a new mowing blade can be inserted.

The problem on which the invention is based exists in the fact that when the mowing blade is replaced it is not possible—or only with great difficulty—to notice wear on the holder.

SUMMARY OF THE INVENTION

According to the invention when a new mowing blade is inserted, the shaped feature on the inner region becomes visible if the holder has undergone an impermissible amount of wear. This result serves as an indication that the holder should also be replaced. The shaped feature may be anything which is noticeable even during the harsh and dirty operating conditions of agricultural machinery. In particular the shape feature may be a notch, a groove, an opening, a shoulder, impressions, welded-on parts, etched areas, high-resistance raised elements which are glued on, welded on, soldered on, shrunk on, etc. These features may have one or more stages and so correspond to different degrees of wear. It is also conceivable to provide the visual feature not on the mowing blade itself but on an element mounted on the holder, parallel to the mowing blade, such as a metal strip, or for an end edge of this element to take on the shaped feature. This element would also become visible if the holder were worn, by means of a hole surrounding the holder, and could provide an indication of wear. The invention could also be used in similar manner if the hole were not in the mowing blade but in the mowing cutter disc and the holder were not secured in the cover or a securing element but on the mowing blade.

The mowing cutter disc includes a cover and a securing element which may rotate together, but may be separated from one another and are movable relative to one another. The holder for fixing the mowing blade may be secured to either of these two parts, in which case it is important that they may be moved away from one another so that a mowing blade can be inserted or removed.

If the inner region could also be covered by a different cover (mower housing, blade holder, deflector, etc.), it is useful if it is covered by a cover of the mowing cutter disc, because this always rotates with it and the cover does not need to be put into a particular position in which the position of the shaped feature has to be determined for the wear to be noticed.

If the shaped feature is selected such that it forms a shoulder or the like which may come into abutment against the outer periphery of the mowing cutter disc when the wear limit is reached, the mowing blade becomes immobile and is thus prevented from performing a back-and-forth movement against the mowing cutter disc which would cause further wear. In addition, stopping in this manner is noticed immediately.

Mowing blades may be constructed in various forms (rectangular, triangular, double-bladed, etc.) and may be used in various mowing machines, having horizontal or vertical mower bars.

BRIEF DESCRIPTION OF THE DRAWINGS

An exemplary embodiment of the invention is described in more detail below with reference to the accompanying drawings, wherein.

DESCRIPTION OF THE PREFERRED EMBODIMENT

Figure 1:
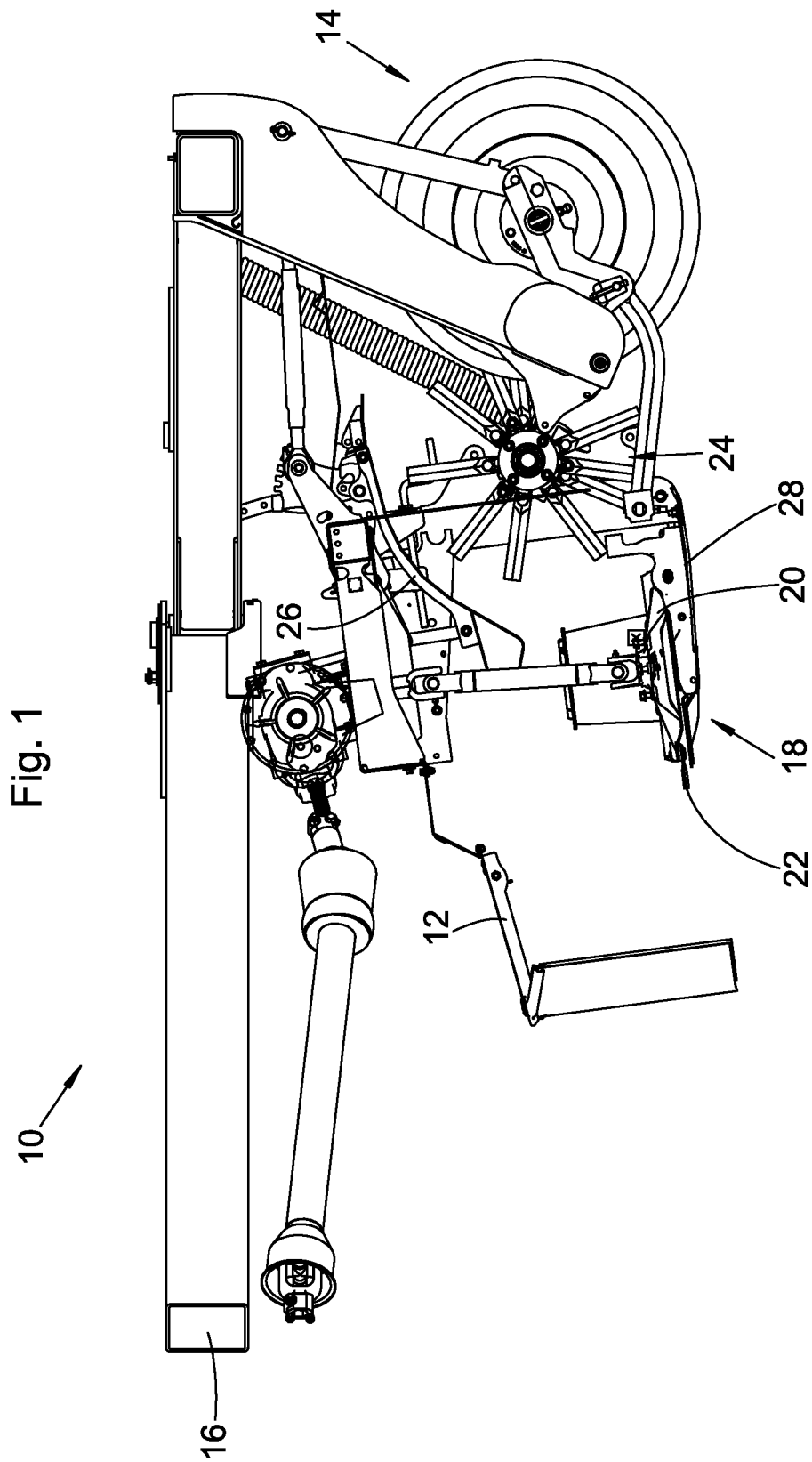
FIG. 1 is a schematic illustration of a mowing machine in side view, in which a mowing cutter disc having a mowing blade is visible.
Figure 2:
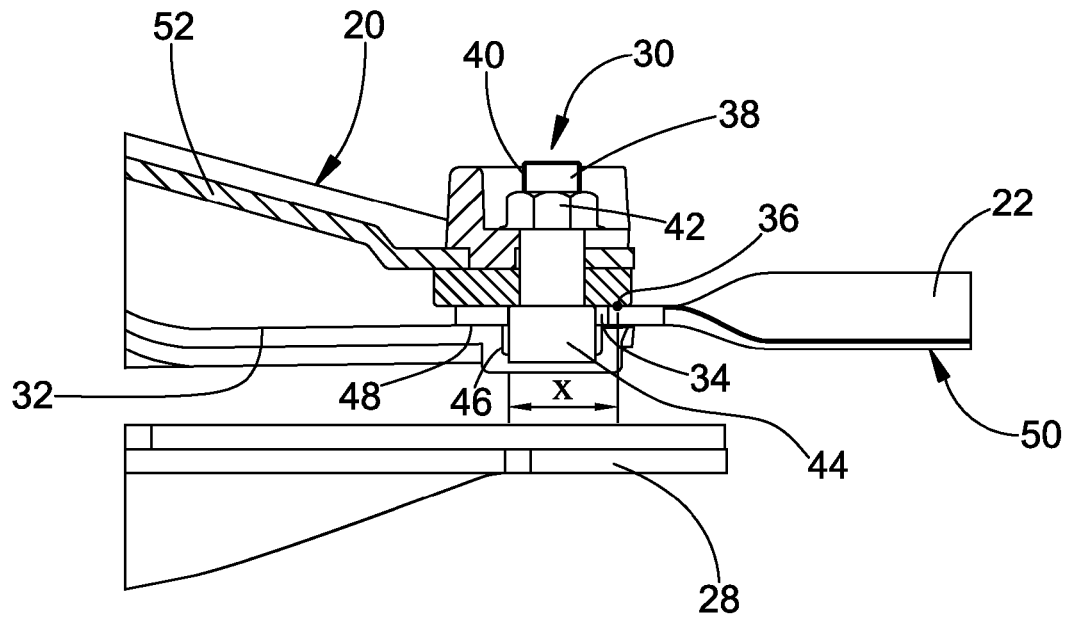
FIG. 2 is a sectional illustration of a mowing blade, fixed to a mowing cutter disc, in a non-worn condition.

FIG. 1 shows a mowing machine 10 having a housing 12, an undercarriage 14, a draw bar 16, a mower bar 18 having mowing cutter discs 20 and mowing blades 22, a device 24 for processing cuttings and a cutting feed device 26.

The mowing machine 10 is in this case illustrated as a drawn or towed arrangement; this is irrelevant, since the important features are only the mowing cutter discs 20 and the mowing blades 22 secured thereto; instead of this, the mowing machine 10 may also be mounted on a coupling device or be of self-propelled construction. A mowing machine 10 of this kind is used primarily in agriculture to mow grass close to ground level.

The housing 12 upwardly and laterally covers the mower 18 such that no one can erroneously come close to the mower 18 and no cuttings can be flung off.

The undercarriage 14 includes two laterally mutually spaced wheels and a chassis to which the wheels and indeed the housing 12 are vertically movably connected.

The draw bar 16 extends forwards from the undercarriage 14 and serves to connect the mowing machine 10 to a towing vehicle such as an agricultural tractor.

The mower 18 extends transversely to the direction of travel of the mowing machine 10 and over the entire width thereof. The underside of the mower 18 is formed by a mower bar 28 in the form of a gearbox in which the mowing cutter discs 20 are borne drivably such that they are rotatable about substantially vertical axes.

The mowing cutter discs 20 are constructed such that they are substantially oval, triangular or round in plan view and are provided in the narrow end regions, corner regions or around the circle of the periphery with a respective holder 30, these being evenly distributed and each for receiving a mowing blade 22. The mowing cutter discs 20 rotate at a slight spacing above the mower bar 28. The mowing cutter discs 20 include a cover 52 and a securing element 32. The securing element 32 is provided below the cover 52 and is connected to it such that it cannot rotate in relation thereto. In this exemplary embodiment, the securing element 32 is constructed as a leaf spring and extends under the holder 30. In the operating condition, the mowing cutter discs 20 are driven at approximately 2000 rpm and are exposed among other things to soil, stones, foreign bodies and so on which reach the region of the holder 30 and subject it to wear.

Figure 4:
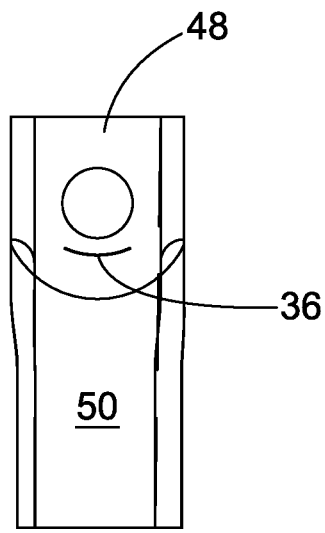
FIG. 4 is a mowing blade with a shaped feature, in plan view.
Figure 5:
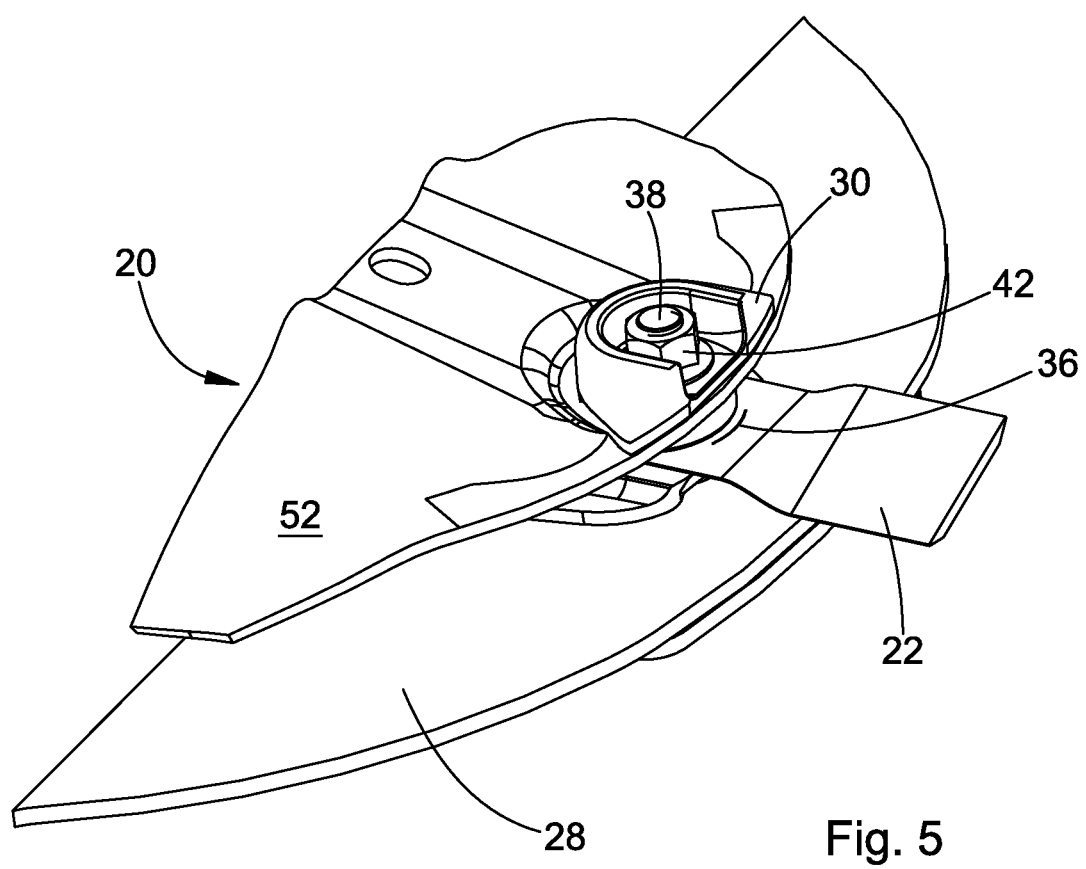
FIG. 5 is a perspective view of the mowing cutter disc, with the mowing blade and the shaped feature.

In this exemplary embodiment, the mowing blades 22 are constructed as rectangular, as seen in plan view (see FIG. 4) and made of forged steel; they may be shaped to be planar, twisted, cropped, bent or shaped in any other way to obtain excellent wear and cutting/feeding properties. The mowing blades 22 are provided in a radially inner region 48 with a largely round hole 34 and in an opposing, outer region 50 with a shaped feature 36 on the upper side. The side of the shaped feature 36 that faces the holder 30 is at a spacing "X" from the inner edge of the hole 34, the edge remote therefrom.

The device 24 for processing cuttings is in this case constructed as a toothed rotor which takes up the cuttings from the mower 18 and conveys them overhead to the rear, that is to the right as seen in FIG. 1. It is not necessary for a device 24 of this kind for processing cuttings to be provided or to be constructed as a toothed rotor.

The cutting feed device 26 is constructed as a curved sheet-metal hood which guides the cuttings over part of a circle arc.

The holder 30 includes a peg 38, screw, bolt, projection or the like whereof, in the installed condition, the upper end region 40 is secured in the cover 52 by means of a nut 42 and whereof the lower end region is provided with a head 44 which is constructed to be wider than the rest of the peg 38. The head 44 projects downwards into a recess 46 in the securing element 32 and is considerably longer than the mowing blade 22 is thick. The head 44 is dimensioned such that it fits into the hole 34 in the mowing blade 22 with little play. The holder 30 could also be secured in the securing element 32, in which case it would extend into a recess 46 in the cover 52.

The securing element 32 is provided with the recess 46, in which the head 44 is received with as little play as possible. The securing element 32 is urged towards the holder 30 by an internal or external spring force, such that on the one hand it securely receives the head 44 and on the other it secures the mowing blade 22 between itself and the holder 30 or the underside of the cover 20. The securing element 32 may be pressed away from the cover 52, in opposition to the spring force, by means of a lever (not shown), such that the head 44 is released and a gap is produced between the end face of the head 44 and the securing element 32 or the cover 52, and a mowing blade 22 may be installed or removed through this gap.

In the installed condition of the mowing blade 22, the hole 34, the head 44 and the recess 46 are concentric in relation to an axis which at the same time forms the pivot axis of the mowing blade 22.

In this case, the shaped feature 36 is constructed as a permanently visible notch made in the upper side of the mowing blade 22; as described at the outset, the shaped feature 36 may also be of a completely different construction and may also be provided on the underside or laterally if this is more advantageous.

Figure 3:
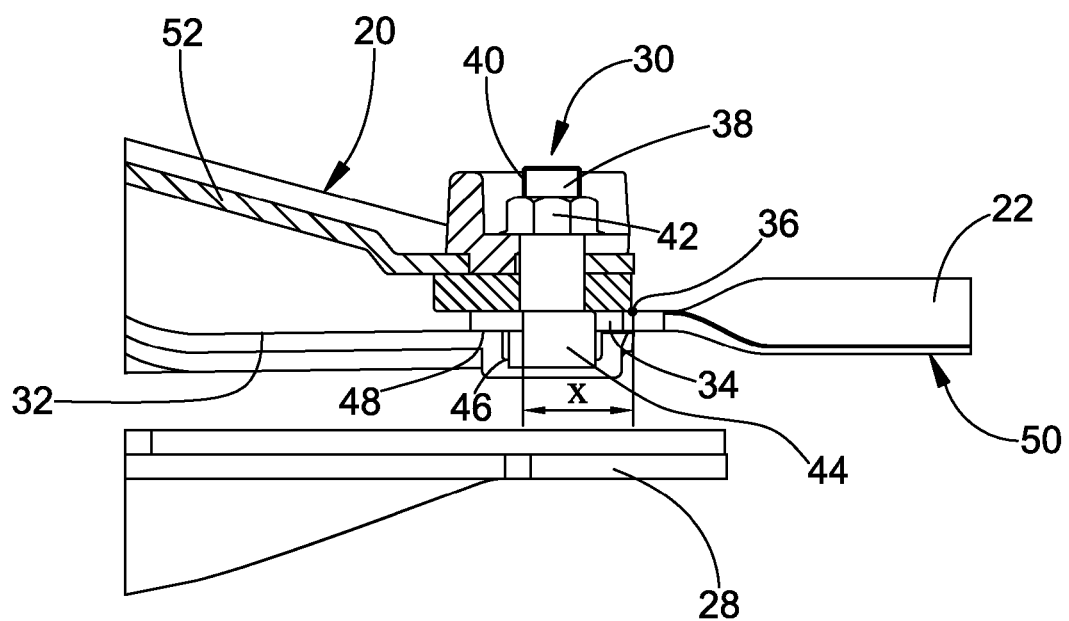
FIG. 3 is the illustration from FIG. 2, in a worn condition.

From the description above it follows that the layout and function are as follows:

To install a mowing blade 22, the securing element 32 is pressed downwards, away from the cover 52, and a mowing blade 22 is inserted through the gap that is thereby produced, between the underside of the head 44 and the upper side of the securing element 32, such that the hole 34 therein comes into congruence with the head 44. Then the securing element 32 is released, and under the action of the spring it moves towards the cover 52, wherein the head 44 is received in the recess 46; this secures the mowing blade 22 to or around the holder 30. After installation, the mowing blade 22 is drawn radially away from the axis of rotation of the mowing cutter disc 20. If the shaped feature 36 becomes visible in the end position of the mowing blade 22 (see FIG. 3) then wear has arisen thereon at the side of the peg 38 which is on the left as seen in FIG. 3, and this makes it imperative to replace the holder 30 as well.

Having described the preferred embodiment, it will become apparent that various modifications can be made without departing from the scope of the invention as defined in the accompanying claims.

The invention claimed is:

1. A mowing cutter disc comprising:
   a mowing blade; and
   a holder being supported by the mowing cutter disc and being adapted for passing through a hole in the mowing blade,
   wherein in an installed condition an inner region of the mowing blade is hidden, an outer region is exposed, and the holder may not exceed a maximum permissible amount of wear,
   wherein a shaped feature of the mowing blade adjoins the outer region at a spacing X from the hole which is associated with the maximum permissible amount of wear of the holder such that the shaped feature remains hidden when the holder has not yet undergone the maximum amount of wear and becomes visible when the holder has undergone the maximum amount of wear,
   wherein the shaped feature is selected such that it is one of: no longer allows the mowing blade to be inserted into the mowing cutter disc; and the mowing blade is immobilized once a certain amount of wear has been exceeded.

2. A mowing blade adapted for use with a holder, the holder being supported by a mowing cutter disc and being adapted for passing through a hole in the mowing blade, wherein in an installed condition an inner region of the mowing blade is hidden, an outer region is exposed, and the holder may not exceed a maximum permissible amount of wear, wherein a shaped feature of the mowing blade adjoins the outer region at a spacing X from the hole which is associated with the maximum permissible amount of wear of the holder such that the shaped feature remains hidden when the holder has not yet undergone the maximum amount of wear and becomes visible when the holder has undergone the maximum amount of wear, wherein the shaped feature is selected such that it is one of: no longer allows the mowing blade to be inserted into the mowing cutter disc; and the mowing blade is immobilized once a certain amount of wear has been exceeded.

* * * * *